United States Patent [19]
Kalvin

[11] Patent Number: 5,878,102
[45] Date of Patent: Mar. 2, 1999

[54] USE OF COMPUTER TOMOGRAPHY SCOUT IMAGES AS AN ALTERNATIVE TO SINOGRAM DATA

[75] Inventor: Alan David Kalvin, Irvington, N.Y.

[73] Assignee: International Business Machines Corporation, Armonk, N.Y.

[21] Appl. No.: 947,786

[22] Filed: Oct. 9, 1997

Related U.S. Application Data

[60] Provisional application No. 60/028,399 Oct. 15, 1996.
[51] Int. Cl.$^6$ ....................................................... A61B 6/03
[52] U.S. Cl. ................................ 378/4; 378/901; 382/131
[58] Field of Search .......................... 378/4, 901; 382/131

[56] References Cited

U.S. PATENT DOCUMENTS 5,243,664  9/1993  Tuy .......................................... 382/130

OTHER PUBLICATIONS

Dr. F. W. Zonneveld, "The scanogram: technique and applications,"IV European Congress of Radiology, 4–8, Sep. 1979, Hamburg, pp. 25–28.

*Primary Examiner*—David P. Porta
*Assistant Examiner*—David Vernon Bruce
*Attorney, Agent, or Firm*—Whitham, Curtis & Whitham; Louis J. Percello, Esq.

[57] ABSTRACT

In an x-ray computed tomography imaging system, it is often useful to have access to the unreconstructed CT projection data, called sinogram data. Scout image data can be converted to a sinogram using a series of computer implemented algorithms, since the original sinogram data may be unavailable or in a proprietary format. Using this conversion, multiple scout images may be substituted for unavailable sinogram data.

5 Claims, 8 Drawing Sheets

USE OF COMPUTER TOMOGRAPHY SCOUT IMAGES AS AN ALTERNATIVE TO SINOGRAM DATA

CROSS-REFERENCE TO RELATED APPLICATIONS

The present application claims priority to co-pending U.S. provisional application 60/028,399 filed on Oct. 15, 1996.

BACKGROUND OF THE INVENTION

FIELD OF THE INVENTION

The present invention generally relates to computerized tomography (CT). More specifically, the invention relates to a system and method that uses CT scout images to replace sinogram data.

BACKGROUND OF THE DESCRIPTION

Computed Tomography (CT) scanners create cross-sectional two-dimensional pictures of three-dimensional objects (e.g., the human body), by a process known as "image reconstruction from projection data."

In analyzing these pictures by computer, it is often extremely advantageous to have access to the original, unreconstructed CT projection data (also known as sinogram data). For example, to reduce errors in image reconstruction by preprocessing the projection data prior to image reconstruction.

Unfortunately, these projection data are not made available to the users of CT scanners, and it is practically impossible to persuade CT manufacturers to provide access to them (and/or the proprietary data formats need to decode the data).

Furthermore, even if access to sinogram data were made available, there are cases when it is not clinically feasible to generate it. For example, obtaining CT projection data of the complete spine of a patient is not practical on two accounts, both related to the amount of time required to do the complete scan. First, the lengthy scanning time means that the patient would be exposed to an unacceptable dose of ionizing radiation. Second, since it is extremely difficult (if not impossible) for a patient to lie completely still for an extended period of time, the CT images produced would be corrupted by "motion artifacts" (imaging errors caused by patient motions during scanning). Therefore, image processing algorithms that rely on the use of projection data are of theoretical interest only, and have no practical or clinical use.

CT scout data are X-ray pictures created by CT scanners, used to assist CT technicians in planning the details of a CT scanning session. Scout images provide a pictorial format for the technician to specify the range, angle and spacing of a stack of two-dimensional cross-sectional pictures that make up a CT study. In most cases, one or two scout images are acquired as part of a CT study. Scout data (unlike sinogram data) are a form of unencoded projection data that are readily available to users of standard clinical CT scanners.

The basic concepts described are better understood with review of the following definitions and with reference to FIG. 8.

RAY: This refers to a single X-ray beam 71 that travels from the CT scanner X-ray tube 72 to a detector cell on the CT scanner detector 73 array.

VIEW: A view 74 consists of the complete set of rays 71 produced by a CT scanner when the X-ray tube 72 is in a fixed position.

SINOGRAM: This is a set of views collected when the CT table is held in a fixed position. These views are acquired at different positions of the X-ray tube as it rotates around the patient. A sinogram consist of all the views used to create one two-dimensional (2D) CT image.

SCOUT: A scout image is a 2D digital X-ray produced by a CT scanner. It is produced by scanning an object with the X-ray tube held in a fixed position while the table and object on it move.

SUMMARY OF THE INVENTION

It is therefore an object of the present invention to provide a system and method for using a set of scout images to obtain a set of sinograms.

Since CT scout data are a form of X-ray data readily accessible to user of standard clinical CT scanners, the inventive procedure uses CT scout data as a practical alternative to sinogram data. The basic idea is to acquire multiple scout images (the optimal number depending on the particular application), and using these projection images as a substitute to the unavailable sinogram data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
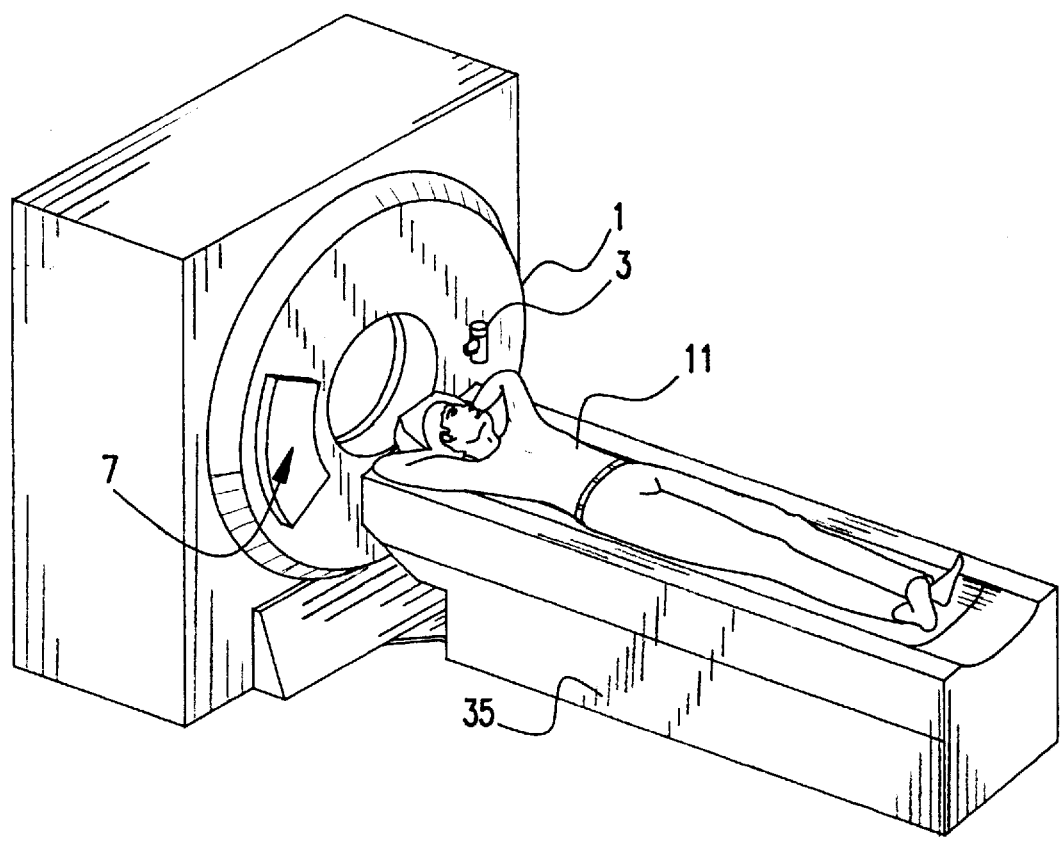
FIG. 1 is a schematic view of a typical CT scan procedure.

Referring now to the drawings, and more particularly to FIG. 1, there is shown a schematic view of a typical computer tomography (CT) system. Gantry 1 has an X-ray source 3 that projects a fan beam of X-rays 5 through a collimator toward a detector array 7 on the opposite side of the gantry 1. The detector array 7 is formed by a number of detector elements 9 (shown in FIG. 2) which together sense the projected X-rays that pass through an object to be scanned 11. Each detector element 9 produces an electrical signal that represents the intensity of an impinging X-ray beam and hence the attenuation of the beam as it passes through the object 11. During a scan to acquire X-ray projection data, the gantry 1 and the components mounted thereon rotate about a center of rotation 13 (shown in FIG. 2) located within the object 11.

Figure 2:
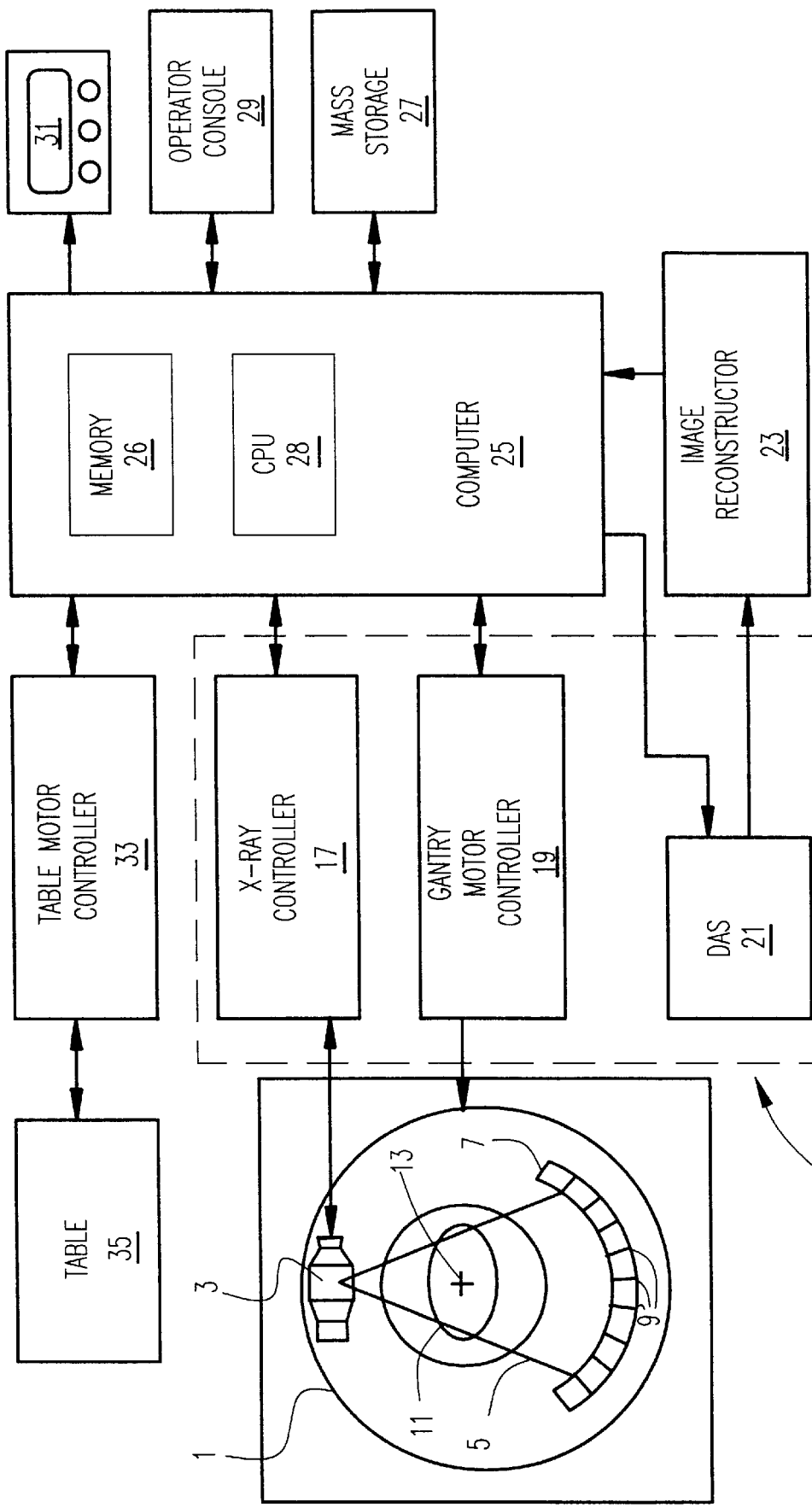
FIG. 2 is a block diagram showing a CT system with computer connections.

The block diagram in FIG. 2 shows the computer which controls the operation of the CT system. The rotation of the gantry and the operation of the X-ray source 3 are governed by a control mechanism 15 of the CT system. The control system. The control mechanism 15 includes an X-ray controller 17 that provides power and timing signals to the X-ray source 3 and a gantry motor controller 19 that controls the rotational speed and position of the gantry 1. A data acquisition system (DAS) 21 in the control mechanism 15 samples analog scan data from detector elements 9 and converts the data to digital signals for subsequent processing. An image reconstructor 23, such as a conventional array processor, receives sampled and digitized X-ray scan data from the DAS 21 and performs high speed image reconstruction. The reconstructed image is applied as an input to a computer 25 which stores the image in a mass storage device 27.

The computer 25 also receives commands and scanning parameters from an operator via console 29. An associated cathode ray tube display 31 allows the operator to observe the reconstructed image and other data from the computer. The operator supplied commands and parameters are used by the computer 25 to provide control signals and information to the DAS 21, the X-ray controller 17 and the gantry motor controller 19. In addition, computer 25 operates a table motor controller 33 which controls a motorized table 35 to position the object 11 in the gantry 1. The computer 25 may have a memory 26 with a data structure and a central processing unit 28.

During a scan a series of views of the object is acquired as the gantry 1 rotates about the axis 13. Each view is a set of X-ray scan data values which indicate the number of X-ray photos sensed by the respective detector elements 9. This collection of projections results in a sinogram. A computer algorithm then converts the sinogram data into a two-dimensional CT image. The table is stationary during this process. To create additional CT images, the table is moved by a given amount, and then another sinogram is produced and converted into a 2D CT image. The computer algorithm may be running on the CT scanner, but it is not required to do so.

Figure 3:
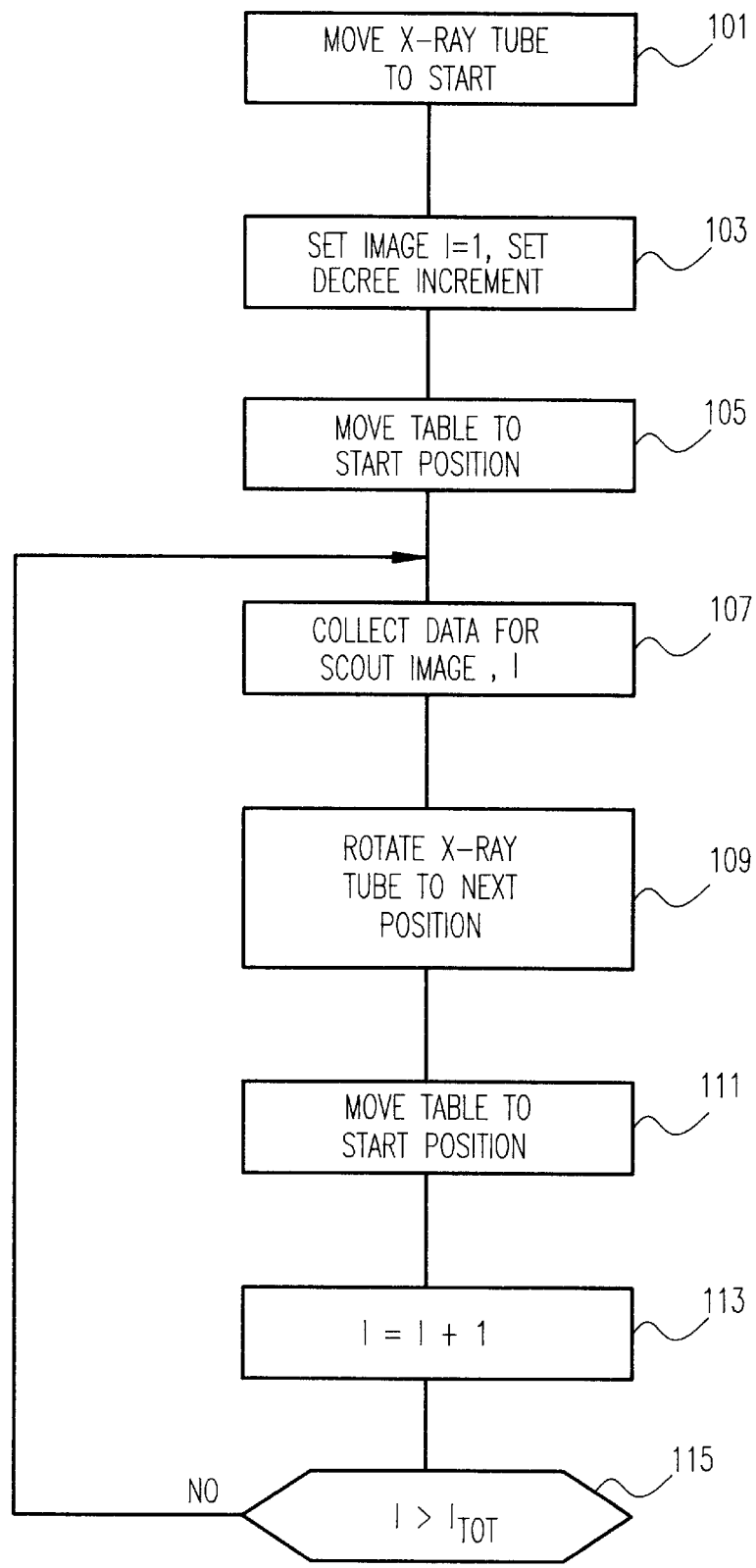
FIG. 3 is a flow chart of the steps of collecting scout data for the inventive method.
Figure 4:
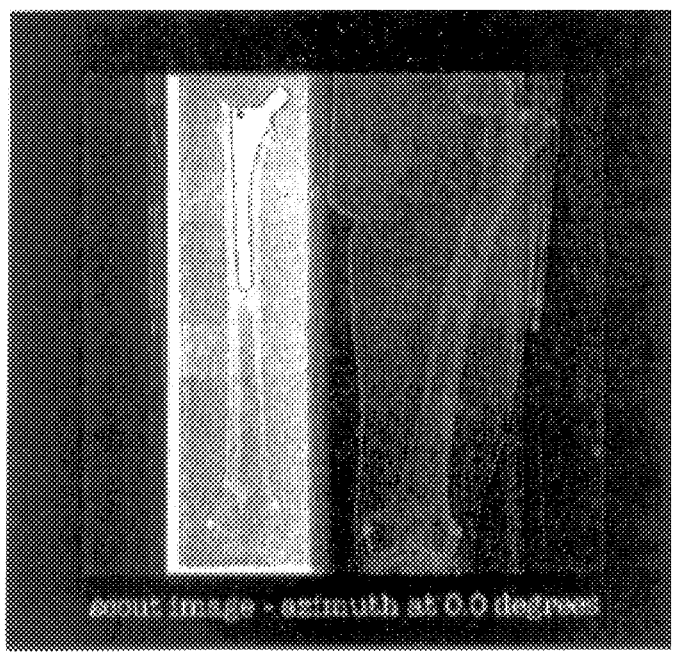
FIG. 4 is a typical scout image.

FIG. 3 is a flow chart of the steps of the inventive method of collecting multiple scout images. The X-ray tube is moved to a start position, as is shown in the step in block 101. At the same time, the degree increment is set. The degree increment refers to the amount of angular rotation of the X-ray tube between the collection of successive scout images. The setting of degree increments determines the total number of images, $I_{TOT}$, collected. For instance, if the degree increment is set for 36°, then the total number of images collected will be ten (360°/36°=10). Then, the image number, I, is set to 1 as shown in the step in block 103. As shown in the step in block 105, the table on which the object is positioned is moved to a start position. Then, as shown in the step in block 107, the data for scout image, I, is collected. This step is performed by moving the table from the start position to an end position and recording sets of projection data, at fixed time intervals, such as every 1/10 of a second. After the all the data for the current scout image have been collected, the X-ray tube is rotated to the next position, as shown in the step in block 109. Then, in the step as shown in block 111 the table is moved to the start position. Then, as shown in the step in block 113, the image number I is incremented by adding one. Next, as shown in the step in block 115, the image number, I is evaluated to determine if it is greater than the total number of images to be collected. If not, the process loops back to collecting data for the scout image, I, in the step in block 107; otherwise, the data collecting process is complete. (Note: This collection of multiple scout images differs from the collection of sinogram data in that with the scout data collection the X-ray tube is not moved until all the projections corresponding to a complete travel of the CT table is completed.) FIG. 4 shows a scout image of a Revision Total Hip Replacement (RTHR) phantom. The phantom consists of a cadaver femur 201 with an implanted metal prosthesis 203, lying inside a water-tank. Alongside this phantom in the figure is a standard thigh phantom 205.

After all the scout images are collected following the steps in FIG. 3, the set of two-dimensional scout images is converted to a set of two-dimensional sinogram images.

Figure 5:
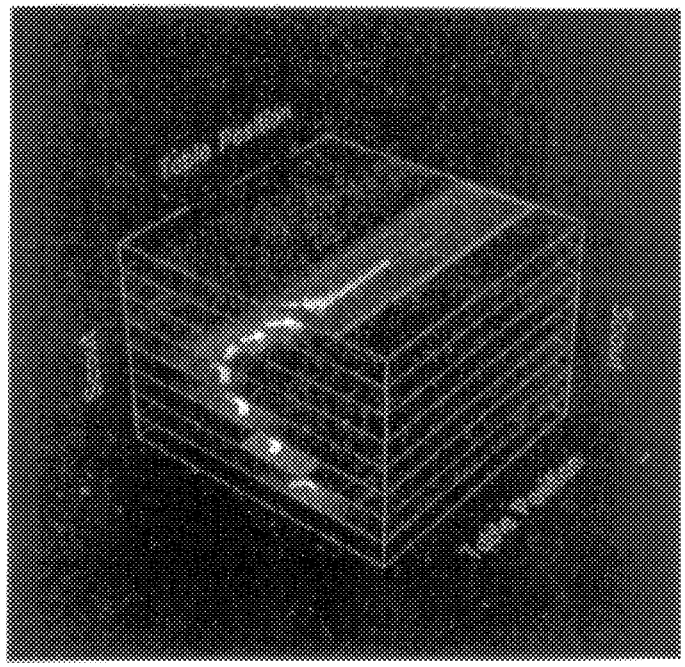
FIG. 5 is a stack of scout images.
Figure 6:
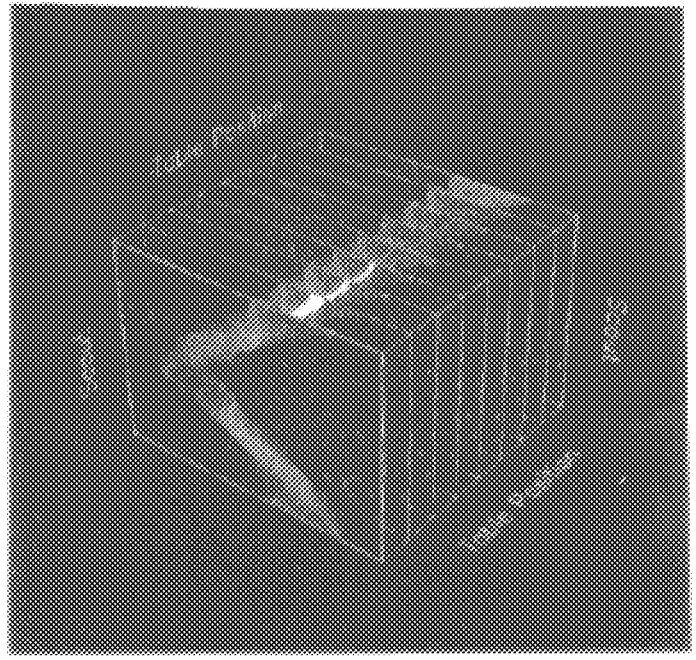
FIG. 6 is a reformatted stack of scout images.

FIGS. 5 and 6 show the relationship between scout images and sinogram data. A set of scout images, which was acquired sequentially by moving the X-ray tube around the patient, is shown stacked into a three-dimensional (3D) volume in FIG. 4. FIG. 5 shows this 3D volume sliced in the "Table Position" dimension; that is, each slice corresponds to the set of data acquired at all X-ray tube positions, at a fixed table position. This is of course equivalent to a sinogram, and the typical sinusoidal-like patterns that give a sinogram its name are easily seen.

Since projection data can be produced from scout images, algorithms, with applications such as (a) CT artifact reduction, and (b)low-radiation dose spinal visualization, etc., that require projection data as input, can use scout images in place of sinogram data.

Figure 7:
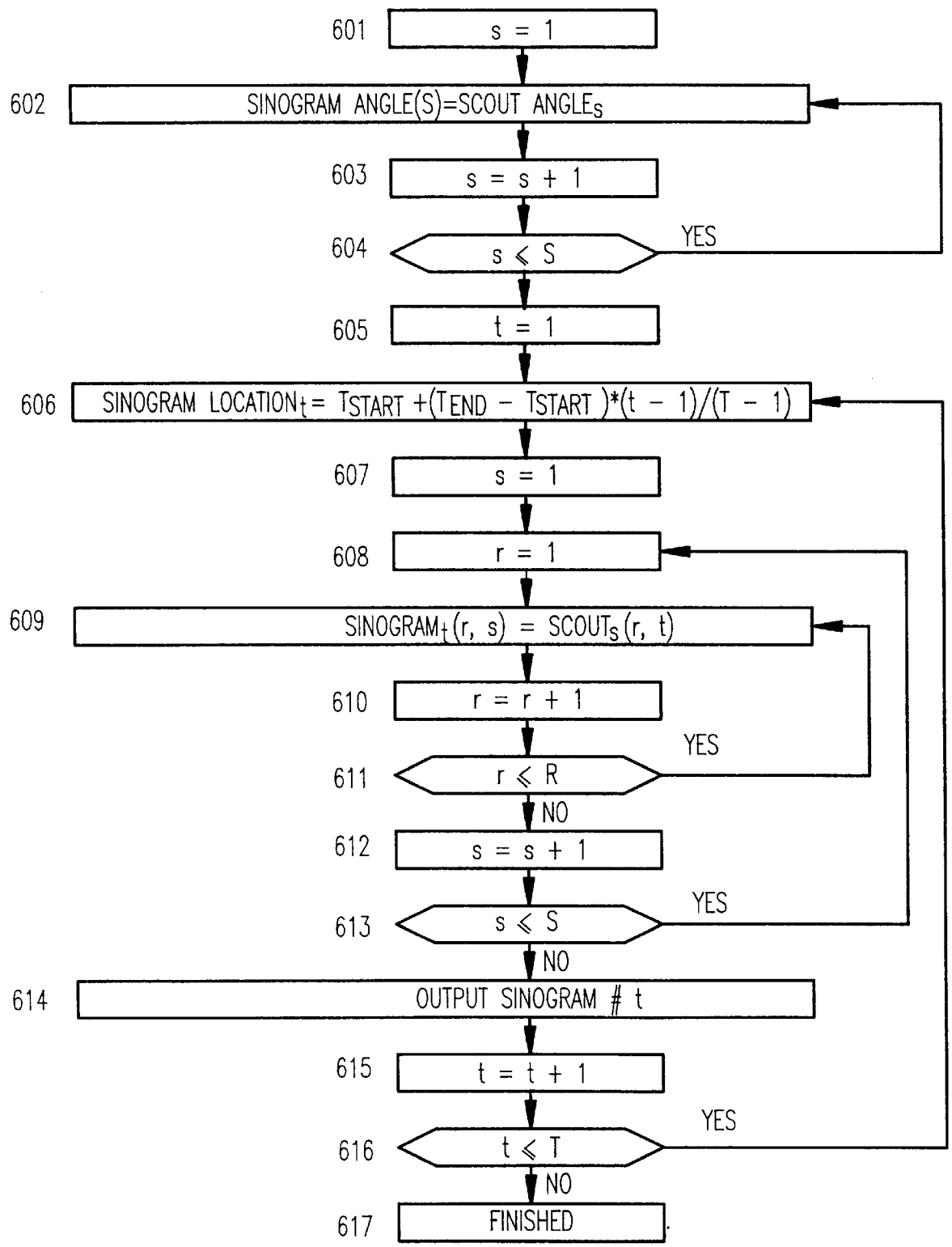
FIG. 7 is a flowchart of the steps of converting scout data.
Figure 8:
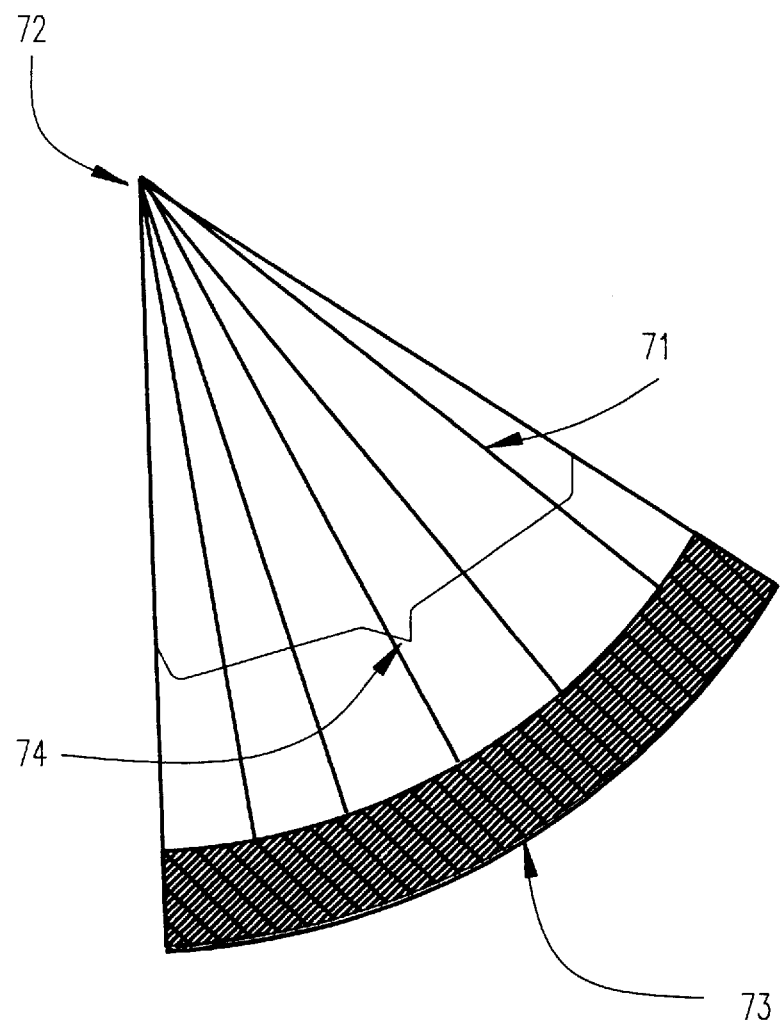
FIG. 8 is a schematic view of a CT ray and projection.

FIG. 7 shows a flow chart of the steps of converting two-dimensional scout images to two-dimensional sinogram images. For this process, S is the total number of scout images, T is the total number of projections in each scout image, and R is the total number of rays in each projection. R and T remain the same for all scouts, s, in the set, S. A total of T sinograms are produced from S scout images.

$Scout_s$ is the two dimensional array of size RxT representing scout image number s. Scout $angle_s$ is the fixed rotational angle of the scanner X-ray tube during the creation of scout number s.

Each sinogram is represented by the following three data sets:

(a) $SINOGRAM_T$, a two-dimensional array the size RxT containing the pixel values of sinogram number t;
(b) SINOGRAM ANGLE, a one dimensional array giving the angle of the X-ray table for each projection in the sinogram; and
(c) TABLE $POSITION_t$, a single number giving the position of the scanner table during the creation of sinogram number t.

First, the one dimensional array SINOGRAM ANGLE of size S is computed as shown in the steps shown in blocks 601 to 604. The process begins by setting the scout image (s) number to one. In the step shown in block 602, the SINOGRAM ANGLE array for s is set equal to the SCOUT $ANGLE_S$. Then, as shown in the step in block 603, one is added to the value of s. In the next step in block 604, if the new s value is less than or equal to S, or the total number of scout images, the process repeats the steps shown in blocks 602 to 604. This loop is used to calculate the values of the array SINOGRAM ANGLE.

Once the s value is greater than S, the index of sinogram number t is set at one. This initializes the index. In the step shown in block 606 a calculation is made to divide spacing between $T_{START}$ and $T_{END}$ evenly, where $T_{START}$ and $T_{END}$ are the start and end location of the scanner table during the creation of each scout image. With this calculation, the table location of sinogram number t is computed.

In the steps shown in blocks 607 and 608 the index of scout image, s, and the index of project ray number, r, are initialized. Then, as shown in the step in block 609, the single array value $SINOGRAM_t(r,s)$ is determined.

In the step shown in block 610, 1 is added to the ray number, r, If it is determined that the ray number, r, is less than or equal to R, in the step shown in block 611, then the steps shown in blocks 609 to 611 are repeated.

Then in the steps shown in blocks 612 and 613, 1 is added to the scout image number, s, and a determination is made as to whether s is less than or equal to S. If s is less than or equal to S, then steps shown in blocks 608 to 613 are repeated.

Then, as shown in the step in block 614, the three data sets, SINOGRAM$_t$, SINOGRAM ANGLE, and TABLE POSITION$_t$, which define sinogram number t are output. Next, in the steps shown in blocks 615 and 616, one is added to the projection value, t, and a determination is made as to whether t is less than or equal to T. If t is less than or equal to T, then the steps shown in blocks 606 to 616 are repeated. Once t is greater than T the process is finished as shown in the block 617.

While the invention has been described in terms of a single preferred embodiment, those skilled in the art will recognize that the invention can be practiced with modification within the spirit and scope of the appended claims.

I claim:

1. A system for developing a set of sinograms from a set of scout images of an object, comprising:
    a computer with a memory and a central processing unit (CPU);
    a data structure resident in the memory, the data structure having a plurality tables, each of the tables representing one of a plurality of scout images, each scout image being taken at an azimuth position with respect to the patient, the scout image being one or more X-rays of the patient at one or more axial locations of the patient; and
    a process, executed by the CPU, that extracts a two-dimensional subset of the data structure, the subset having all of the entries with a common axial position, the subset being the sinogram.

2. A system, as in claim 1, wherein the X-rays are taken as the object continuously traverses the source in an axial direction.

3. A computer implemented process for generating sinograms from three dimensional X-ray data comprising the steps of:
    acquiring a plurality of two-dimensional X-ray images and storing data representing the X-ray images in computer memory;
    processing the X-ray image data in computer memory as stacked two-dimensional X-ray data forming a three-dimensional image; and
    slicing the three-dimensional data perpendicular to the stacked two-dimensional X-ray data to generate two-dimensional sinograms.

4. A computer implemented process as in claim 3 wherein said X-ray data scout data and said X-ray images are scout images.

5. A computer implemented method of converting scout image data to sinograms comprising the steps of:
    (a) computing a one dimensional array comprising of a multiplicity of sinogram angles;
    (b) initializing an index of a sinogram number;
    (c) computing an even spacing between a multiplicity of table positions;
    (d) initializing an index of a scout image;
    (e) initializing an index of a project ray number;
    (f) determining a single array value based on said project ray number and said scout image;
    (g) increasing said project ray number by one;
    (h) repeating steps (f) and (g) until said project ray number is greater than a preset total ray number;
    (i) increasing said scout image index by one;
    (j) repeating steps (e) to (i) until said scout image is greater than a preset total scout image;
    (k) outputting three data sets which define said sinogram number;
    (l) adding one to said sinogram number; and
    (m) repeating steps (b) to (l) until said sinogram number is greater than a preset sinogram total.

* * * * *